UNITED STATES PATENT OFFICE.

THOMAS MACALPINE, OF LONDON, ENGLAND, ASSIGNOR TO THE ALCOHOL SYNDICATE, LIMITED, OF SAME PLACE.

PROCESS OF REFINING MINERAL OILS.

SPECIFICATION forming part of Letters Patent No. 655,500, dated August 7, 1900.

Application filed May 25, 1899. Serial No. 718,303. (No specimens.)

*To all whom it may concern:*

Be it known that I, THOMAS MACALPINE, a subject of the Queen of Great Britain, residing at Chiswick, London, in the county of Middlesex, England, have invented certain new and useful Improvements in Processes of Refining Mineral Oils; and I do hereby declare the following to be a full, clear, and exact description of the invention, such as will enable others skilled in the art to which it appertains to make and use the same.

My invention relates to a process of refining mineral oils chiefly by the aid of a special preparation of manganese. This manganese compound is prepared in the following manner: To a solution or emulsion composed of water containing the oxids, hydrates or carbonates of calcium, barium, magnesium, sodium, potassium, or ammonium is added a nearly-saturated solution of the permanganates or manganates of calcium, barium, magnesium, sodium, potassium, or ammonium, and the mixture is treated with acetylene gas, which is either obtained in the ordinary way by the mutual decomposition of water and calcium carbid and passed into the mixture or is produced directly in the mixture itself by introducing calcium carbid thereinto.

In practice I find it convenient to take a solution in water of carbonate of sodium or carbonate of potash or of a mixture of the two of a specific gravity of about 1.07, although it is to be understood that I do not restrict myself to these substances, but may use any of the substances mentioned above. To this solution I add a saturated or nearly-saturated solution in water of permanganate of potash, taking care not to add an excess. The point at which the addition of permanganate should be stopped can be determined by observing the color of the solution or emulsion. If an excess of permanganate is used, the color will be purplish red. The addition of the permanganate should be stopped as soon as a faint reddish tinge appears in the solution or emulsion. It should be understood that I do not limit myself to the permanganate of potash, but that any of the permanganates or manganates mentioned above may be used. When the proper amount of permanganate has been added, the mixture is subjected to the action of acetylene gas intermittently for some time. The acetylene gas causes a precipitate containing manganese to be thrown down, which precipitate is then separated by filtration in the usual manner.

The above processes are usually conducted at the ordinary temperatures; but to accelerate the process the temperatures of the solutions may be slightly raised, and to increase the speed of absorption the acetylene gas may be introduced into the liquid mixture under pressure. Having thus prepared my acetylene compound of manganese, I take crude mineral oil and treat it with said manganese compound in the following way: To one hundred gallons of oil I add five pounds or thereabout of the manganese compound and allow the whole to rest for several hours or days, with occasional agitation, or the mixture may be submitted to continual agitation for several hours. I then allow the mixture to settle, and when subsidence has taken place the oil is removed and distilled.

With very impure petroleum or mineral oils I may use an alkali to assist the action of the manganese, and if such oils are very impure, indeed, I may use a mineral acid, preferably sulfuric acid. When an alkali is used, the proportions are about as follows: For every ten pounds of the manganese compound prepared as above described from four to five pounds of caustic soda or caustic potash are mixed with the oil before the addition of the manganese compound, and in case acid is used for every ten pounds of the manganese compound four or five pounds of concentrated sulfuric acid diluted with about seven times its weight of water are used, which acid may be mixed with the oil before the addition thereto of the manganese compound.

In case acid is used after the action of the manganese compound upon the oil I may add a sufficient quantity of alkali to neutralize all excess of acid. The salt thus formed and the excess of alkali are removed by washing the oil with water, after which the oil is distilled either with or without filtration or subsidence. In the operation of distillation it is advantageous to do this under a complete or partial vacuum. This may be done either by means of a surface condenser fitted up in the usual way with air and circulating pumps or by bringing the hot vapor into direct contact with a jet of water in a condenser, both being thereafter discharged by the air-pump into a tank or cistern. The oil will float and the water may be drawn off from below and used over again, if desired.

While I have thus described my invention, I desire to have it distinctly understood that I do not limit myself to the exact method described. Many variations in the process might occur without departing from the spirit of my invention. For example, after treatment with the manganese compound I may remove the oil therefrom by filtration and then distil the oil; or instead of separating the oil from the manganese compound before distillation the oil may be directly distilled from the mixture without any such operation, and it is obvious that the treatment may be hastened by agitation either by means of compressed air or any suitable mechanical means.

Having thus described my invention, what I claim as new, and desire to secure by Letters Patent of the United States, is—

1. The process of refining petroleum and mineral oils, which consists in subjecting them to the action of a compound of acetylene and manganese, substantially as described.

2. The process of refining petroleum and mineral oils, which consists in subjecting them to the action of a compound of acetylene and manganese and separating the purified oil from the mixture, substantially as described.

3. The process of refining petroleum and mineral oils, which consists in subjecting them to the action of a compound of acetylene and manganese, with or without the addition of other purifying agents, allowing the mixture to settle, with or without agitation, removing the oil and distilling it, substantially as described.

4. The process of refining petroleum and mineral oils, which consists in subjecting them to the joint action of a compound of acetylene and manganese and an alkali, substantially as described.

5. The process of refining petroleum and mineral oils, which consists in subjecting them to the joint action of a compound of acetylene and manganese and a mineral acid, substantially as described.

6. The process of refining petroleum and mineral oils, which consists in subjecting them to the joint action of a compound of acetylene and manganese and a mineral acid, removing the excess of acid by treatment with a neutralizing agent, such as alkali, washing out the excess of said agent and distilling the oil with or without filtering or settling, substantially as described.

7. The process of refining petroleum and mineral oils, which consists in subjecting them to the action of a compound of acetylene and manganese, with or without the addition of other purifying agents, allowing the mixture to settle, with or without agitation, removing the oil and distilling under a partial or complete vacuum, substantially as described.

In testimony whereof I affix my signature in presence of two witnesses.

THOMAS MACALPINE.

Witnesses:
FREDERIC PRINCE,
CHARLES S. MOLE.